United States Patent
Butts, III et al.

(10) Patent No.: US 10,852,151 B2
(45) Date of Patent: Dec. 1, 2020

(54) DYNAMIC RECONFIGURING OF GEO-FENCES

(71) Applicant: Square, Inc., San Francisco, CA (US)

(72) Inventors: James F. Butts, III, San Francisco, CA (US); Daniel Hipschman, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 794 days.

(21) Appl. No.: 14/568,905

(22) Filed: Dec. 12, 2014

(65) Prior Publication Data

US 2016/0169696 A1    Jun. 16, 2016

(51) Int. Cl.
*G01C 21/34* (2006.01)
*G06Q 30/02* (2012.01)
*H04W 4/021* (2018.01)

(52) U.S. Cl.
CPC ..... *G01C 21/3476* (2013.01); *G01C 21/3461* (2013.01); *G01C 21/3484* (2013.01); *G06Q 30/0251* (2013.01); *G06Q 30/0259* (2013.01); *G06Q 30/0261* (2013.01); *H04W 4/021* (2013.01)

(58) Field of Classification Search
CPC ............ G01C 21/3476; G01C 21/3461; G01C 21/3484; G06Q 30/0251; G06Q 30/0259; G06Q 30/0261; H04W 4/021
USPC .............. 705/14.64, 26.7, 14.23, 333, 14.58; 455/456.3, 456.1; 726/1, 7; 701/300; 704/246
See application file for complete search history.

(56) References Cited

U.S. PATENT DOCUMENTS

| | | |
|---|---|---|
| 6,026,375 A | 2/2000 | Hall et al. |
| 6,646,659 B1 | 11/2003 | Brown et al. |
| 6,839,682 B1 | 1/2005 | Blume et al. |
| 7,024,205 B1 | 4/2006 | Hose |
| 7,324,958 B2 | 1/2008 | Miyazaki et al. |
| 7,376,433 B1 | 5/2008 | Hose |

(Continued)

FOREIGN PATENT DOCUMENTS

DE    20 2012 100 620 U1    8/2012
JP    4200645 B2 * 12/2008 ............. G06F 16/94

(Continued)

OTHER PUBLICATIONS

Miguel Torroja, Steve Malkos, and Christophe Verne, 2013, Putting the (ultra-low) Power in GeoFence (Year: 2013).*

(Continued)

*Primary Examiner* — Tarek Elchanti
(74) *Attorney, Agent, or Firm* — Polsinelli PC

(57) ABSTRACT

Geo-fences may be dynamically reconfigured to identify merchants that may be of particular interest to users. In some instances, a geo-fence may be defined for a particular user based on a variety of information, in order to identify merchants that may be of interest to the user and that are located within proximity to the user. The geo-fence may be defined based on purchase history, places that are frequented by the user, a mode of transportation, a navigation or transportation route, user preferences, and/or a variety of other information. Information regarding the identified merchants may be displayed or otherwise output to notify the user of nearby merchants that may be of interest.

20 Claims, 8 Drawing Sheets

(56) References Cited

U.S. PATENT DOCUMENTS

| | | |
|---|---|---|
| 7,407,089 B2 | 8/2008 | Patrick |
| 7,680,690 B1 | 3/2010 | Catalano |
| 7,711,100 B2 | 5/2010 | Dennis |
| 7,725,326 B1 | 5/2010 | Tracy et al. |
| 7,730,151 B1 | 6/2010 | Fabbri et al. |
| 7,848,765 B2 | 12/2010 | Phillips et al. |
| 7,970,418 B2 | 6/2011 | Schmidt et al. |
| 8,001,044 B2 | 8/2011 | Davis |
| 8,065,080 B2 | 11/2011 | Koch |
| 8,090,351 B2 | 1/2012 | Klein |
| 8,135,624 B1 | 3/2012 | Ramalingam et al. |
| 8,200,247 B1 | 6/2012 | Starenky et al. |
| 8,229,458 B2 | 7/2012 | Busch |
| 8,417,377 B2 | 4/2013 | Rothschild |
| 8,490,871 B1 | 7/2013 | Miller |
| 8,504,073 B2 | 8/2013 | Svendsen et al. |
| 8,626,591 B2 | 1/2014 | Ablowitz |
| 8,635,157 B2 | 1/2014 | Smith et al. |
| 8,645,366 B1 | 2/2014 | Acharya |
| 8,756,187 B2 | 6/2014 | Wilson et al. |
| 8,892,249 B2 | 11/2014 | Holman et al. |
| 8,898,288 B2 | 11/2014 | Petersen et al. |
| 8,918,355 B2 | 12/2014 | Perrier et al. |
| 9,218,633 B2 | 12/2015 | Hulett et al. |
| 9,334,150 B1 | 5/2016 | Ost et al. |
| 9,499,385 B1 | 11/2016 | Studor |
| 9,589,290 B1 | 3/2017 | Hipschman et al. |
| 9,779,446 B1 | 10/2017 | Hipschman et al. |
| 10,127,595 B1 | 11/2018 | Daniel et al. |
| 10,410,272 B1 | 9/2019 | Johnson et al. |
| 10,430,849 B1 | 10/2019 | Hipschman et al. |
| 10,755,254 B1 | 8/2020 | Hipschman et al. |
| 2002/0059147 A1 | 5/2002 | Ogasawara |
| 2002/0065728 A1 | 5/2002 | Ogasawara |
| 2002/0174010 A1 | 11/2002 | Rice, III |
| 2003/0061109 A1 | 3/2003 | Banerjee et al. |
| 2003/0069780 A1 | 4/2003 | Hailwood et al. |
| 2003/0204447 A1 | 10/2003 | Dalzell et al. |
| 2004/0093281 A1 | 5/2004 | Silverstein et al. |
| 2004/0236696 A1 | 11/2004 | Aoki et al. |
| 2004/0249497 A1 | 12/2004 | Saigh et al. |
| 2006/0143073 A1 | 6/2006 | Engel et al. |
| 2006/0200305 A1 | 9/2006 | Sheha et al. |
| 2007/0088624 A1 | 4/2007 | Vaughn et al. |
| 2007/0150375 A1 | 6/2007 | Yang |
| 2007/0203801 A1 | 8/2007 | Istfan |
| 2007/0281689 A1 | 12/2007 | Altman et al. |
| 2008/0104199 A1 | 5/2008 | Kalaboukis |
| 2008/0154781 A1 | 6/2008 | Kumar |
| 2008/0294751 A1 | 11/2008 | Dreiling |
| 2009/0005987 A1* | 1/2009 | Vengroff ............... G06Q 30/02 701/300 |
| 2009/0006156 A1 | 1/2009 | Hunt et al. |
| 2009/0048890 A1 | 2/2009 | Burgh |
| 2009/0063312 A1 | 3/2009 | Hurst |
| 2009/0204492 A1 | 8/2009 | Scifo et al. |
| 2010/0114654 A1 | 5/2010 | Lukose et al. |
| 2010/0184416 A1 | 7/2010 | Gupta et al. |
| 2010/0274597 A1 | 10/2010 | Dill |
| 2010/0312385 A1 | 12/2010 | Deuber |
| 2011/0125566 A1 | 5/2011 | McLaughlin et al. |
| 2011/0201317 A1 | 8/2011 | Karandikar et al. |
| 2011/0238474 A1* | 9/2011 | Carr ..................... H04W 4/029 705/14.23 |
| 2011/0256881 A1* | 10/2011 | Huang ................. G01S 5/0257 455/456.1 |
| 2011/0260860 A1 | 10/2011 | Gupta |
| 2011/0313867 A9 | 12/2011 | Silver |
| 2011/0321146 A1* | 12/2011 | Vernon ................. G06F 21/35 726/7 |
| 2012/0078673 A1 | 3/2012 | Koke et al. |
| 2012/0127490 A1 | 5/2012 | Ogasawara et al. |
| 2012/0156337 A1 | 6/2012 | Studor et al. |
| 2012/0276928 A1* | 11/2012 | Shutter ................. G06Q 30/02 455/456.3 |
| 2012/0284769 A1* | 11/2012 | Dixon ................... H04W 4/021 726/1 |
| 2012/0295639 A1 | 11/2012 | Fitoussi et al. |
| 2013/0024375 A1 | 1/2013 | Choudhuri et al. |
| 2013/0024376 A1 | 1/2013 | Choudhuri et al. |
| 2013/0030955 A1 | 1/2013 | David |
| 2013/0035114 A1 | 2/2013 | Holden et al. |
| 2013/0040663 A1 | 2/2013 | Gold |
| 2013/0103541 A1 | 4/2013 | Chow |
| 2013/0151380 A1 | 6/2013 | Holt |
| 2013/0169046 A1 | 7/2013 | Shin et al. |
| 2013/0178233 A1* | 7/2013 | McCoy ................. H04W 4/021 455/456.3 |
| 2013/0218991 A1 | 8/2013 | McConnell et al. |
| 2013/0297321 A1 | 11/2013 | Raux et al. |
| 2013/0311315 A1 | 11/2013 | Zises |
| 2014/0012806 A1 | 1/2014 | Ching et al. |
| 2014/0045516 A1* | 2/2014 | Turgman ............... H04W 4/021 455/456.1 |
| 2014/0074610 A1* | 3/2014 | Bilange ................. G06Q 50/01 705/14.58 |
| 2014/0108177 A1 | 4/2014 | Erke et al. |
| 2014/0156410 A1* | 6/2014 | Wuersch ............ G06Q 30/0261 705/14.58 |
| 2014/0195454 A1* | 7/2014 | Richie ................. G06Q 10/0833 705/333 |
| 2014/0279123 A1 | 9/2014 | Harkey et al. |
| 2014/0279192 A1 | 9/2014 | Selby |
| 2014/0289071 A1 | 9/2014 | Fox et al. |
| 2014/0289073 A1 | 9/2014 | Gold |
| 2014/0324431 A1* | 10/2014 | Teasley ................... G10L 15/22 704/246 |
| 2014/0359510 A1 | 12/2014 | Graf et al. |
| 2014/0379578 A1 | 12/2014 | Chan et al. |
| 2015/0039462 A1* | 2/2015 | Shastry ............. G06Q 30/0633 705/26.7 |
| 2015/0120509 A1 | 4/2015 | Moring et al. |
| 2015/0142604 A1 | 5/2015 | Kneen |
| 2015/0254699 A1 | 9/2015 | Bondesen et al. |
| 2015/0262244 A1 | 9/2015 | Rados et al. |
| 2015/0302383 A1 | 10/2015 | Mills et al. |
| 2015/0304806 A1 | 10/2015 | Vincent |
| 2016/0125506 A1 | 5/2016 | Carr et al. |
| 2017/0011450 A1 | 1/2017 | Frager et al. |
| 2017/0270573 A1 | 9/2017 | Kim et al. |
| 2019/0355034 A1 | 11/2019 | Moring et al. |

FOREIGN PATENT DOCUMENTS

| | | |
|---|---|---|
| WO | 2014032047 A1 | 2/2014 |
| WO | 2015/066056 A1 | 5/2015 |
| WO | 2016/094500 A2 | 6/2016 |

OTHER PUBLICATIONS

Extended European Search Report for European Patent Application No. 15867710.4, dated Sep. 14, 2017.

International Search Report and Written Opinion for PCT Application No. PCT/US2015/064671 dated Feb. 23, 2016.

Non Final Office Action dated Mar. 3, 2015, for U.S. Appl. No. 14/587,758, of Hipschman, D., et al., filed Dec. 31, 2014.

Non-Final Office Action dated Apr. 2, 2015, for U.S. Appl. No. 14/587,984, of Hipschman, D., et al., filed Dec. 31, 2014.

Final Office Action dated Sep. 25, 2015, for U.S. Appl. No. 14/587,758, of Hipschman, D., et al., filed Dec. 31, 2014.

Final Office Action dated Sep. 25, 2015, for U.S. Appl. No. 14/587,984, of Hipschman, D., et al., filed Dec. 31, 2014.

Non-Final Office Action dated Oct. 7, 2015, for U.S. Appl. No. 14/587,913, of Hipschman, D., et al., filed Dec. 31, 2014.

Advisory Action dated Feb. 19, 2016, for U.S. Appl. No. 14/587,984, of Hipschman, D., et al., filed Dec. 31, 2014.

Non-Final Office Action dated Apr. 4, 2016, for U.S. Appl. No. 14/587,984, of Hipschman, D., et al., filed Dec. 31, 2014.

(56) References Cited

OTHER PUBLICATIONS

Non-Final Office Action dated Apr. 21, 2016, for U.S. Appl. No. 14/587,758, of Hipschman, D., et al., filed Dec. 31, 2014.
Final Office Action dated Sep. 8, 2016, for U.S. Appl. No. 14/587,913, of Hipschman, D., et al., filed Dec. 31, 2014.
Notice of Allowance dated Oct. 13, 2016, for U.S. Appl. No. 14/587,984, of Hipschman, D., et al., filed Dec. 31, 2014.
Final Office Action dated Nov. 4, 2016, for U.S. Appl. No. 14/587,758, of Hipschman, D., et al., filed Dec. 31, 2014.
Advisory Action dated Dec. 12, 2016, for U.S. Appl. No. 14/587,913, of Hipschman, D., et al., filed Dec. 31, 2014.
Non-Final Office Action dated Feb. 23, 2017, for U.S. Appl. No. 14/311,176, of Moring, M.D., et al., filed Jun. 20, 2014.
Non-Final Office Action dated Mar. 9, 2017, for U.S. Appl. No. 14/588,044, of Hipschman, D., et al., filed Dec. 31, 2014.
Advisory Action dated Mar. 13, 2017, for U.S. Appl. No. 14/587,758, of Hipschman, D., et al., filed Dec. 31, 2014.
Notice of Allowance dated Apr. 21, 2017, for U.S. Appl. No. 14/587,758, of Hipschman, D., et al., filed Dec. 31, 2014.
Non-Final Office Action dated May 19, 2017, for U.S. Appl. No. 14/464,276, of Johnson, L., et al., filed Aug. 20, 2014.
Notice of Allowance dated May 23, 2017, for U.S. Appl. No. 14/587,913, of Hipschman, D., et al., filed Dec. 31, 2014.
Final Office Action dated Jul. 20, 2017, for U.S. Appl. No. 14/588,044, of Hipschman, D., et al., filed Dec. 31, 2014.
Final Office Action dated Aug. 10, 2017, for U.S. Appl. No. 14/311,176, of Moring, M.D., et al., filed Jun. 20, 2014.
Non-Final Office Action dated Sep. 20, 2017, for U.S. Appl. No. 14/587,758, of Hipschman, D., et al., filed Dec. 31, 2014.
Final Office Action dated Nov. 24, 2017, for U.S. Appl. No. 14/464,276, of Johnson, L., et al., filed Aug. 20, 2014.
Non-Final Office Action dated Feb. 13, 2018, U.S. Appl. No. 14/311,176, of Moring, M.D., et al., filed Jun. 20, 2014.
Non-Final Office Action dated Apr. 9, 2018, for U.S. Appl. No. 14/588,044, of Hipschman, D., et al., filed Dec. 31, 2014.
Non-Final Office Action dated Apr. 20, 2018, for U.S. Appl. No. 14/464,276, of Johnson, L., et al., filed Aug. 20, 2014.
International Search Report and Written Opinion for International Application No. PCT/US2014/062697, dated Feb. 10, 2015.
Notice of Allowance dated May 16, 2018, for U.S. Appl. No. 14/587,758, of Hipschman, D., et al., filed Dec. 31, 2014.
Final Office Action dated Jul. 20, 2018, U.S. Appl. No. 14/311,176, of Moring, M.D., et al., filed Jun. 20, 2014.
Final Office Action dated Aug. 28, 2018, for U.S. Appl. No. 14/588,044, of Hipschman, D., et al., filed Dec. 31, 2014.
Final Office Action dated Nov. 16, 2018, for U.S. Appl. No. 14/464,276, of Johnson, L., et al., filed Aug. 20, 2014.
Advisory Action dated Nov. 20, 2018, for U.S. Appl. No. 14/588,044, of Hipschman, D., et al., filed Dec. 31, 2014.
Notice of Allowance dated Apr. 17, 2019, for U.S. Appl. No. 14/464,276, of Johnson, L., et al., filed Aug. 20, 2014.
Notice of Allowance dated May 23, 2019, for U.S. Appl. No. 14/588,044, of Hipschman, D., et al., filed Dec. 31, 2014.
Final Office Action dated Jul. 1, 2019, for U.S. Appl. No. 15/395,721, of Hipschman, D., et al., filed Dec. 30, 2016.
"Uber—Android Apps on Google Play," dated Nov. 10, 2014, Retrieved from the Internet URL: https://play.google.com/store/apps/details?id=com.ubercab&hl=en, on Nov. 12, 2014, pp. 2.
Hachman, M., "MobilePay: Your Phone Is Your Credit Card," dated Sep. 28, 2010, Retrieved from the Internet URL: http://www.pcmag.com/article2/0,2817,2369877,00.asp, on Sep. 25, 2013, p. 1.
Siegler, MG., "MobilePay May Be the Death of the Wallet. Yes, for Real This Time," TechCrunch, dated Sep. 28, 2010, Retrieved from the internet URL: http://techcrunch.com/2010/09/28/mobilepayusa/, on Sep. 22, 2013, pp. 12.
Non-Final Office Action dated Dec. 11, 2018, for U.S. Appl. No. 15/395,721, of Hipschman, D., et al., filed Dec. 30, 2016.
Notice of Allowance dated Jan. 24, 2019, for U.S. Appl. No. 14/311,176 of Moring, M.D., et al., filed Jun. 20, 2014.
Notice of Allowance dated Feb. 20, 2019, for U.S. Appl. No. 14/311,176 of Moring, M.D., et al., filed Jun. 20, 2014.
Advisory Action dated Nov. 18, 2019, for U.S. Appl. No. 15/395,721, of Hipschman, D., et al., filed Dec. 30, 2016.
Examination Report for European Patent Application No. 15867710.4, dated Dec. 10, 2019.
Corrected Notice of Allowability dated Jul. 22, 2020, for U.S. Appl. No. 15/395,721, of Hipschman, D., et al., filed Dec. 30, 2016.
Notice of Allowance dated Apr. 17, 2020, for U.S. Appl. No. 15/395,721 of Hipschman, D. et al., filed Dec. 12, 2014.

* cited by examiner

DYNAMIC RECONFIGURING OF GEO-FENCES

BACKGROUND

Users often seek to find merchants, such as restaurants, gas stations, hotels, and so on, that are located within proximity to the users. These users may utilize online websites or mobile applications to search through various merchants that might satisfy their needs. The websites and mobile applications provide a map or list of merchants that may be of interest to the users. For example, a user desiring to dine-out, may search for restaurants with a mobile application that provides a map of restaurants that are located within a 0.2 mile radius of the user. However, users often spend relatively large amounts of time sifting through the merchants that are identified by these websites and mobile applications to find merchants that satisfy their needs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
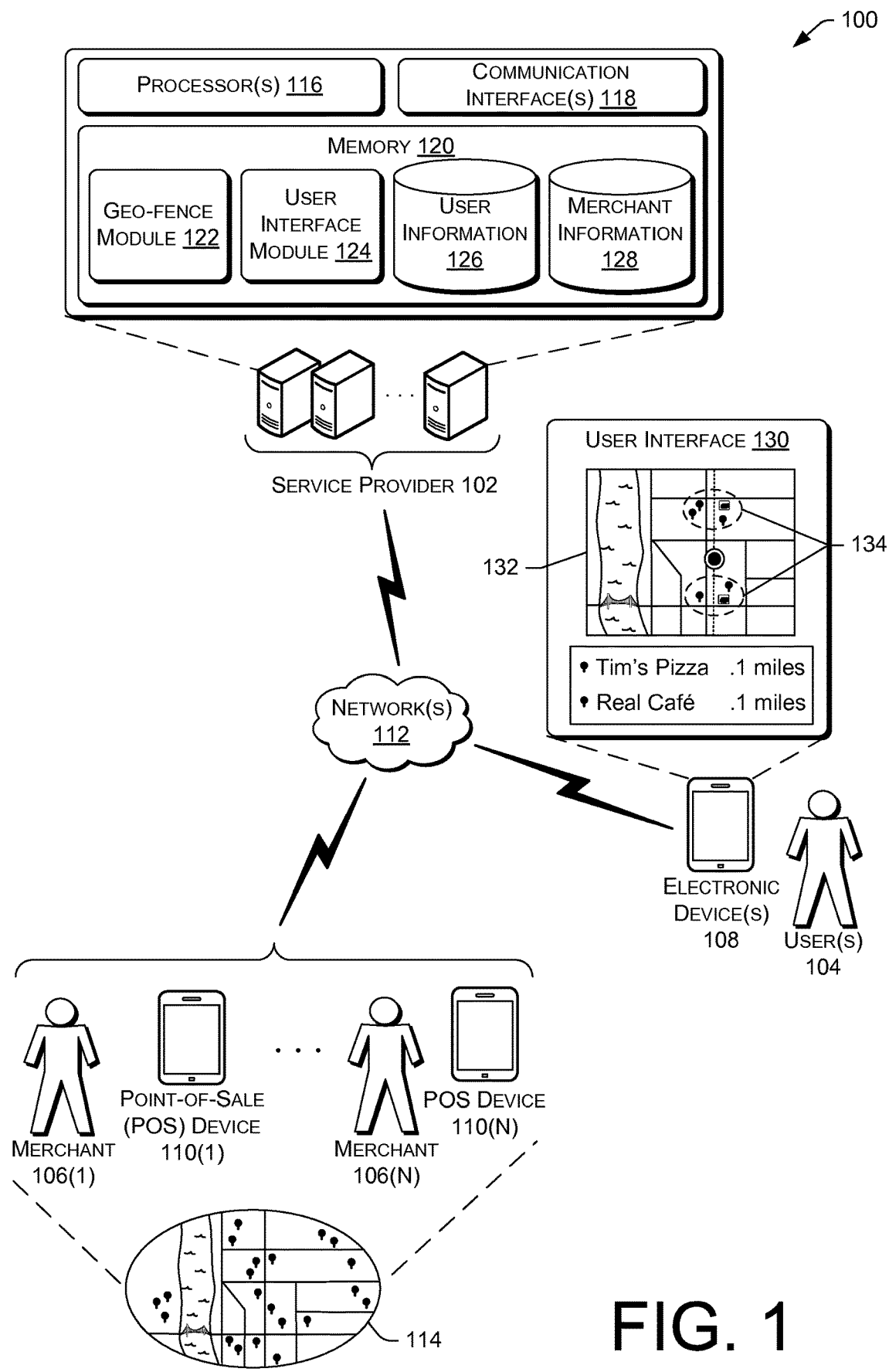
FIG. 1 illustrates an example environment for dynamically reconfiguring geo-fences to identify merchants that may be of particular interest to users.

Some implementations described herein include techniques and arrangements for dynamically reconfiguring geo-fences to identify merchants that may be of particular interest to users. In some instances, the techniques may define a geo-fence for a particular user based on a variety of information, in order to identify merchants that may be of interest to the user and that are located within proximity to the user. The geo-fence may be defined based on purchase history, places that are frequented by the user, a mode of transportation, a navigation or transportation route, user preferences, or a variety of other information. For example, a geo-fence may encompass locations the user is likely to visit (e.g., in view of previously visited locations) or locations that the user is able to visit (e.g., due to a current mode of transportation). Information regarding an identified merchant may be displayed or otherwise output to notify the user of nearby merchants that may be of interest.

To find merchants, the user may utilize an electronic device to request information from a service provider regarding merchants that are in proximity to the user. The request may also specify a desired attribute for the merchants, such as a particular rating, category of items, price range, and so on. In response to receiving the request, the service provider may determine a current location of the electronic device. The service provider may also determine one or more portions of a geographical region that surrounds the current location of the electronic device based on information related to the user or the geographical region. The one or more portions of the geographical region may each include a perimeter that defines a geo-fence. The service provider may then identify merchants that have establishments located within the one or more portions of the geographical region, such as restaurants, gas stations, hotels, clothing stores, and so on. The service provider may provide information regarding the merchants to the electronic device of the user, so that the user may identify merchants that are located within proximity and that may be of interest to the user. Although in some instances the techniques are described as being performed by a service provider, the techniques may alternatively, or additionally, be performed by an electronic device associated with a user or any other computing device.

As one example, suppose a user that is currently located in a downtown region is interested in finding a restaurant for dinner. The user may interact with an electronic device to request information regarding restaurants in the downtown region. In this example, the user provides input requesting locations of four-star restaurants. The electronic device sends the request to a service provider, which identifies merchants that may be of interest to the user. The service provider may utilize various types of information to identify one or more portions of the downtown region that may be of interest to the user. The service provider may then identify four-star restaurants that are located within the one or more portions of the downtown region and send information about these restaurants to the electronic device of the user. The information may be displayed or otherwise output to the user via the electronic device.

In one illustration, the service provider may identify the one or more portions of the downtown region from locations that have been most frequented by the user (e.g., places that have been visited more than a threshold number of times). For instance, if the service provider determines from purchase history, location information, or otherwise that the user visits a particular plaza in the downtown region multiple times a week, then the service provider may provide information about four-star restaurants that are located at the particular plaza. Further, if the service provider determines that the user avoids crossing a bridge to purchase food, then restaurants that are located across the bridge may not be identified to the user, even if those restaurants are located relatively close to the user (e.g., within a particular distance).

In another illustration, the service provider may identify one or more portions of the downtown region, and associated restaurants, from information about how the user is traveling. For instance, if the user is using a particular mode of transportation, such as an underground transit system (e.g., subway), then the service provider may provide information to the user about four-star restaurants located within a predetermined proximity to stations of the underground transit system (e.g., subway stops). Alternatively, or additionally, the service provider may utilize a speed or direction of travel of the user and/or a navigation or transportation route (e.g., route in a mapping service, highway path, etc.) to identify the one or more portions of the downtown region and merchants located in those one or more portions.

In yet another illustration, the service provider may identify one or more portions of the downtown region, and associated restaurants, from current conditions of the geographical region. For instance, if the current weather conditions include rain, then the service provider may identify merchants that are located indoors (e.g., located within a mall or covered plaza) or located in relatively close proximity to the user. Further, if there is a relatively large amount of traffic, then the service provider may identify one or more portions of the downtown region, and associated merchants, that are located in relatively close proximity to the user. The service provider may also reference a current time of day or year and/or events occurring in the downtown region. In yet further illustrations, the service provider may identify one or more portions of the downtown region, and associated restaurants, from a variety of other information.

By determining one or more portions of a geographical region from various types of information, the service provider may intelligently identify merchants that may be of interest to a user. This may ultimately enhance the user's experience in finding nearby merchants. Further, by intelligently identifying one or more portions of a geographical region, and associated merchants, the techniques may reduce the amount of input provided by the user and output to the user to search through merchants in which the user is interested (e.g., avoid the user from further specifying the types of merchants that are of interest). This may conserve battery life and/or processing resources.

In many examples discussed herein, a service provider may intelligently identify merchants based on objective factors, such as locations a user has previously visited, locations a user is able to visit due to a mode of transportation, and so on. Here, the merchants may be identified without determining a level of interest in the merchants. However, in other examples a more subjective approach may be taken that determines a level of interest in the merchants.

For discussion purposes, some example implementations are described below with reference to the corresponding figures. However, implementations herein are not limited to the particular examples provided, and may be extended to other environments, other system architectures, other types of merchants, and so forth, as will be apparent to those of skill in the art in light of the disclosure herein.

FIG. 1 illustrates an example environment 100 for dynamically reconfiguring geo-fences to identify merchants that may be of particular interest to users. For example, the environment 100 may enable a service provider 102 to determine one or more portions of a geographical region that surrounds one or more users 104 (hereinafter "the user 104"). The service provider 102 may then send information to the user 104 regarding one or more merchants, from among a plurality of merchants 106(1)-(N), that are located within the one or more portions of the geographical region. In particular, the information regarding the one or more merchants may be sent to one or more electronic devices 108 (hereinafter "the electronic device 108") employed by the user 104. As illustrated, each of the plurality of merchants 106 may be associated with a point-of-sale (POS) device 110 to engage in various transactions of items with customers and perform other processing. The service provider 102, the electronic device 106, and/or the plurality of POS devices 110 may communicate via one or more networks 112.

A merchant may include any business engaged in the offering of goods or services for acquisition by customers. In many instances, a merchant may offer the goods or services for acquisition in exchange for compensation received from customers (e.g., users). Actions attributed to a merchant may include actions performed by employees or other agents of the merchant and, thus, no distinction is made herein between merchants and their employees unless specifically discussed. In addition, a customer may include any entity that acquires goods or services from a merchant, such as by purchasing, renting, leasing, borrowing, licensing, or the like. Hereinafter, goods and/or services offered by merchants may be referred to as items. Thus, a merchant and a customer may interact with each other to conduct a transaction in which the customer acquires one or more items from a merchant, and in return, the customer provides payment to the merchant. In many instances herein, the user 104 may comprise a customer that interacts with one of the plurality of merchants 106 to acquire an item.

Each of the plurality of merchants 106 may be associated with an establishment where a transaction of an item may occur. An establishment may include any premises associated with a merchant, such as a geographical place of business (e.g., store), a residence, and so on. An establishment may include land, a building, a vehicle, or other property. In some instances, an establishment may be located at a fixed location that typically does not change on a day-to-day basis. In other instances, however, an establishment may change from time to time, such as in the case that the merchant operates a food truck, is a street vendor, a cab driver, etc., or has an otherwise mobile business (e.g., in the case of merchants who sell items at buyer's homes, places of business, and so forth). In the example of FIG. 1, the plurality of merchants 106 is illustrated as being distributed across various locations on a map 114 (as shown by the pin icons).

The service provider 102 may include one or more computing devices, such as servers, laptop computers, desktop computers, and so on. The one or more computing devices may be configured in a cluster, a farm, a data center, a cloud computing environment, or a combination thereof. In one example, the one or more computing devices provide cloud computing resources, including computational resources, storage resources, and the like.

While FIG. 1 illustrates components and data of the service provider 102 as being present in a single location, these components and data may alternatively be distributed across different computing devices and/or different locations in any manner. Consequently, the functions may be implemented by one or more computing devices, with the various functionality described above distributed in various ways across the different computing devices. Multiple computing devices may be located together or separately, and organized, for example, as virtual servers, server banks, and/or server farms. The described functionality may be provided by the servers of a single entity or enterprise, or may be provided by the servers and/or services of multiple different buyers or enterprises.

As illustrated, the one or more computing devices of the service provider 102 may include one or more processors 116, one or more communication interfaces 118, and memory 120. Each of the one or more processors 116 may include a central processing unit (CPU), a graphics processing unit (GPU), a microprocessor, a microcomputer, a microcontroller, a state machine, logic circuitries, a digital signal processor, and so on. For instance, the one or more processors 116 may be one or more hardware processors and/or logic circuits of any suitable type specifically programmed or configured to execute the algorithms and processes described herein. Each of the one or more processors 116 may be a single processing unit or a number of processing units, and may include single or multiple computing units or multiple processing cores. The one or more processors 116 can be configured to fetch and execute computer-readable instructions stored in the memory 120, which can program the one or more processors 116 to perform the functions described herein.

The one or more communication interfaces 118 may include one or more interfaces and hardware components for enabling communication with various other devices, such as over the one or more networks 112. For example, the one or more communication interfaces 118 may enable communication through one or more of the Internet, cable networks, cellular networks, wireless networks (e.g., Wi-Fi) and wired networks, as well as close-range communications such as BLUETOOTH®, BLUETOOTH® low energy, and the like, as additionally enumerated elsewhere herein.

The memory 120 may store software functionality configured as one or more "modules." The term "module" is intended to represent example divisions of the software for purposes of discussion, and is not intended to represent any type of requirement or required method, manner or organization. Accordingly, while various "modules" are discussed, their functionality and/or similar functionality could be arranged differently (e.g., combined into a fewer number of modules, broken into a larger number of modules, etc.). Further, while certain functions and modules are described herein as being implemented by software and/or firmware executable on a processor, in other embodiments, any or all of the modules may be implemented in whole or in part by hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), etc. As illustrated in FIG. 1, the memory 120 includes a geo-fence module 122 and a user interface module 124.

The geo-fence module 122 may configure geo-fences for a geographical region to identify merchants that may be of interest to the user 104. To do so, the geo-fence module 122 may determine a current geographical location of the electronic device 108 associated with the user 104. The current geographical location may be determined in a variety of manners, including receiving information from the electronic device 108 or a location-based service identifying the current geographical location, receiving cell tower information or wireless access point information from the electronic device 108 or a location-based service identifying a cell tower or wireless access point that the electronic device 108 has communicated with recently (e.g., over a previous period of time), and so on. The current geographical location may include a geo-location, a venue, etc. In some instances, the current geographical location of the electronic device 108 may be monitored over time.

In response to receiving a request from the electronic device 108 for information about merchants that are located within proximity to the electronic device 108, the geo-fence module 122 may identify a geographical region around the current geographical location of the electronic device 108. The geographical region may have predefined characteristics (e.g., dimensions, shape, etc.) and may be centered on the current geographical location of the electronic device 108. For instance, the geographical region may include a circle region having a diameter of 0.5 miles and being centered on the location of the electronic device 108. This may facilitate a search for merchants that are within proximity the electronic device 108.

The geo-fence module 122 may then analyze a variety of information to identify one or more portions of the geographical region that may be of interest to the user 104 (e.g., deemed to have more than a threshold level of interest to the user 104). In other words, the geo-fence module 122 may define one or more geo-fences for portions of the geographical region. In some instances, the one or more portions of the geographical region may be associated with predetermined characteristics (e.g., include particular dimensions, shapes, etc.). As discussed below, the geo-fence module 122 may use the portions of the geographical region to identify merchants that may be of interest to the user 104. Example information that may be analyzed to identify one or more portions of a geographical region include:

Location information identifying locations that a user has visited. In some instances, the geo-fence module 122 may analyze the location information to identify portions of a geographical region that have been most frequented with respect to a number of visits to the portions of the geographical region, an amount of time spent in the portions of the geographical region, and so on. The geo-fence module 122 may also account for portions of the geographical region that have not been visited (e.g., avoided). To illustrate, when a user is located in a downtown region, the geo-fence module 122 may identify a plaza or shopping area within the downtown region, since the user has frequently visited the plaza or shopping area. Here, the geo-fence module 122 may exclude a business park area that the user has avoided (not visited and visited locations around the business park area).

Purchase history for a user indicating items that have been purchased, merchants that have sold the items, amounts of purchases, times of purchases, and so on. The purchase history may be formed from transaction information that is received from POS devices. In some instances, the geo-fence module 122 may analyze the purchase history to identify portions of a geographical region that are associated with particular categories of merchants or items that may be of interest to a user. As one example, if a user frequently purchases Chinese food, then the geo-fence module 122 may identify a portion of a downtown region that is associated with Chinese items (e.g., includes Chinese stores or restaurants). In other instances, the geo-fence module 122 may analyze the purchase history to identify locations that have been most frequented by a user (e.g., more than a particular number of times).

Information identifying a mode of transportation that is used by a user. The mode of transportation may indicate that the user is traveling by automobile (e.g., car, truck, etc.), motorcycle, bicycle, foot (e.g., walking, running, etc.), rapid transit (e.g., subway), bus, train, plane, and so on. As one example, if a user is traveling on the subway in a downtown region, the geo-fence module 122 may identify portions of a geographical region that surround stations where the subway stops. As another example, if a user is traveling by automobile on a freeway in a suburb region, the geo-fence module 122 may identify a portion of the suburb region along the freeway that extends a particular distance from the freeway around exits, to encircle restaurants at the exits.

Calendar information identifying appointments for a user. As one example, if a user has an appointment within an upper portion of a downtown region, the geo-fence module 122 may identify the upper portion of the downtown region. As another example, the geo-fence module 122 may identify a relatively large portion of the downtown region when the user has a relatively large amount of available time before an appointment at a location in the downtown region and identify a relatively small portion of the downtown region when the user has a relatively small amount of available time before the appointment. In other words, a size of a portion of a geographical region may be based on an amount of available time a user has before an appointment.

Motion information indicating a current speed or direction of an electronic device, or a recent average speed and directional trend of the electronic device. The motion information may be obtained from an accelerometer, Global Positioning System (GPS), location-based service, speedometer, and so on. As one example, if a user is traveling at 40 mph (e.g., an electronic device associated with the user is traveling at 40 mph) in a downtown region, the geo-fence module 122 may identify portions of the downtown region that are able to be reached within a particular window of time due to the current speed (e.g., within the next 15 minutes). The portions of the downtown region may be located in the direction of travel. In some instances, the portions of the downtown region may increase in size as the speed of the user increases.

Information identifying a current navigation route of a user. This information may be obtained from a navigation service or otherwise. As one example, if a user is traveling from point A to point B in a downtown region, the geo-fence module 122 may identify a portion of the downtown region that extends along the navigation route from point A to point B (e.g., a particular distance to each side of the roads from point A to point B). Alternatively, or additionally, the geo-fence module 122 may identify portions along the navigation route at which a particular event might occur, such as identifying an exit that is estimated to be passed around lunch time.

Information identifying transportation routes in a geographical region. The transportation routes may include roads, highways, freeways, trails (e.g., running trails, biking trails, etc.), railways, waterways, etc. As one example, if a geographical region includes railways, and it is estimated that a user will likely travel via the railways, the geo-fence module 122 may identify portions along the railways, such as stations or stops. In other examples, other portions of the geographical region may be identified, such as entrances or exits for a freeway, metro stops, trailheads, etc.

Information indicating current weather conditions for a geographical region. As one example, if it is raining in a downtown region, the geo-fence module 122 may identify a relatively small portion of the downtown region centered on a current location of a user, instead of a relatively large portion of the downtown region for a sunny day.

Information indicating current traffic conditions for a geographical region. As one example, if current traffic conditions for a downtown region identify an accident in a particular portion of the downtown region, the geo-fence module 122 may identify a portion of the downtown region that does not include the particular portion that is associated with the accident.

Time information indicating a current time of day, week, month, and/or year. As one example, if a user is located in a downtown region and it's 11 AM, the geo-fence module 122 may identify a portion of the downtown region that has been most frequented by the user around 11 AM in the past. Further, the portion of the downtown region may be a portion that has previously been visited for the current time of year (e.g., season, etc.).

Event information identifying an event occurring in a geographical region. As one example, if a user is located in a downtown region and a concert is occurring at a particular plaza, the geo-fence module 122 may identify a portion of the downtown region that surrounds the plaza. This may be due to a user preference for crowds. Alternatively, a different portion of the downtown region may be identified that is away from the concert due to a user preference to avoid crowds.

Social networking information identifying friends associated with a user (or preferences for the friends), content that is made available by the user (e.g., posted content, status, etc.), and so on. As one example, if social networking information indicates that the user's friends prefer Italian food, the geo-fence module 122 may identify a portion of a geographical region that is associated with Italian restaurants, since the user may likely be with his friends. As another example, if social networking information indicates that the user's friends generally congregate in a particular portion of a downtown region, the geo-fence module 122 may identify the particular portion of the downtown region.

User preference information identifying one or more preferences for a user. As one example, if a user prefers 4-star hotels, the geo-fence module 122 may identify portions of a geographical region that include 4-star hotels. As another example, if a user prefers Mexican food to be delivered, the geo-fence module 122 may identify portions of a geographical region that include Mexican restaurants with a delivery option. In some instances, user preference information may be obtained from purchase history.

Information identifying users or animals that are accompanying a user, such as friends, children, dogs, cats, etc. As one example, if a user specifies that he is on a walk with his 5-year old daughter, the geo-fence module 122 may identify portions of a geographical region that are relatively close, in comparison to portions that might be identified if the user was walking with an adult friend.

In some instances, any of the above-noted information that may be utilized by the geo-fence module 122 to identify one or more portions of a geographical region may be stored in the memory 120 as user information 126 and/or merchant information.

Upon identifying one or more portions of a geographical region that may be of interest to the user 104, the geo-fence module 122 may identify merchants having establishments in the one or more portions of the geographical region. For instance, if the geo-fence module 122 identifies a plaza area of a downtown region, then the geo-fence module 122 may identify merchants that have establishments in the plaza area. If, for example, a user is requesting information for merchants that are associated with a particular attribute, the geo-fence module 122 may filter the merchants down to those merchants that are associated with the particular attribute. An attribute of a merchant may include a rating (e.g., rated 4 out of 5 stars by users), a category of items offered for acquisition by the merchant (e.g., lodging, restaurants, shopping, gas service, food, entertainment, etc.), a price range of items that are offered for acquisition (e.g., items under $10, items between $50-100, etc.), and so on. For instance, if a user has requested to find gas stations that offer gas at under $4 a gallon and the user is traveling along a navigation route from point A to point B, the geo-fence module 122 may identify gas stations that are located with a particular proximity to the navigation route and that satisfy the under $4 per gallon criterion.

In many instances, the geo-fence module 122 may identify merchants located within one or more portion of a geographical region by referencing the merchant information 128 stored in the memory 120. The merchant information 128 may include location information of merchants identifying geo-locations of establishments, contact information for the merchants, ratings or reviews of the merchants, information indentifying categories of items that are sold by the merchants, pricing information, or any other information about the merchants.

The user interface module 124 may cause information to be sent to the electronic device 108 regarding merchants that have been identified by the geo-fence module 122. For example, the user interface module 124 may cause contact information of merchants and location information for the merchants to be sent so that the user 104 may find nearby merchants that may be of interest. The user interface module 124 may facilitate a user interface 130 on the electronic device 108. As illustrated in FIG. 1, the electronic device 108 displays the user interface 130 with a map 132 of merchants that satisfy a request from the user 104. In this example, the user 104 is traveling on the subway and, thus, the user interface 130 shows merchants within two regions 134 surrounding stations for the subway. Although information is displayed in this example, in other examples the information is otherwise output, such as in an audio format.

In some instances, the service provider 102 may be associated with payment processing for transactions of items. In such instances, the service provider 102 may include a payment processing module, not illustrated in FIG. 1. The payment processing module may function to receive information regarding a transaction from one of the POS devices 110 and attempt to authorize a payment instrument used to conduct the transaction. The payment processing module may then send an indication of whether the payment instrument has been approved or declined back to the POS device 110.

Generally, when a customer and a merchant enter into an electronic payment transaction, the transaction is processed by electronically transferring funds from a financial account associated with the customer to a financial account associated with the merchant. As such, the payment processing module may communicate with one or more computing devices of a card payment network (e.g., MasterCard®, VISA®) over the one or more networks 112 to conduct financial transactions electronically. The payment processing module can also communicate with one or more computing devices of one or more banks over the one or more networks 112. For example, the payment processing module may communicate with an acquiring bank, an issuing bank, and/or a bank maintaining customer accounts for electronic payments.

An acquiring bank may be a registered member of a card association (e.g., Visa®, MasterCard®), and may be part of a card payment network. An issuing bank may issue credit cards to buyers, and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

The memory 120 (as well as all other memory discussed herein) may include volatile and nonvolatile memory and/or removable and non-removable media implemented in any type of technology for storage of information, such as computer-readable instructions, data structures, program modules, or other data. Such computer-readable media may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the one or more computing device of the service provider 102, the memory 120 may be a type of computer-readable storage media and/or may be a tangible non-transitory media to the extent that when mentioned, non-transitory computer-readable media exclude media such as energy, carrier signals, electromagnetic waves, and signals per se.

The one or more networks 112 can include any appropriate network, including a wide area network, such as the Internet; a local area network, such an intranet; a wireless network, such as a cellular network, a local wireless network, such as Wi-Fi and/or close-range wireless communications, such as BLUETOOTH® and BLUETOOTH® low energy; a wired network; or any other such network, or any combination thereof. Accordingly, the one or more networks 112 may include both wired and/or wireless communication technologies, including BLUETOOTH®, BLUETOOTH® low energy, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail. Accordingly, the service computing device 102, the plurality of POS devices 110, the electronic device 108, and other computing devices discussed herein are able to communicate over the one or more networks 112 using wired or wireless connections, and combinations thereof.

FIGS. 2A-2D illustrate an example user interface 200 that may be provided to notify a user of nearby merchants that may be of interest. The user interface 200 may be displayed via a browser, an application, and so forth. In some instances, an application is implemented as a client application, such as a mobile application, desktop-based application, etc. In other instances, the application is implemented as part of a platform (e.g., a mobile platform), or within another context. In many instances, the user interface 200 is provided to a user provided via an electronic device, such as the electronic device 108.

Figure 2A:
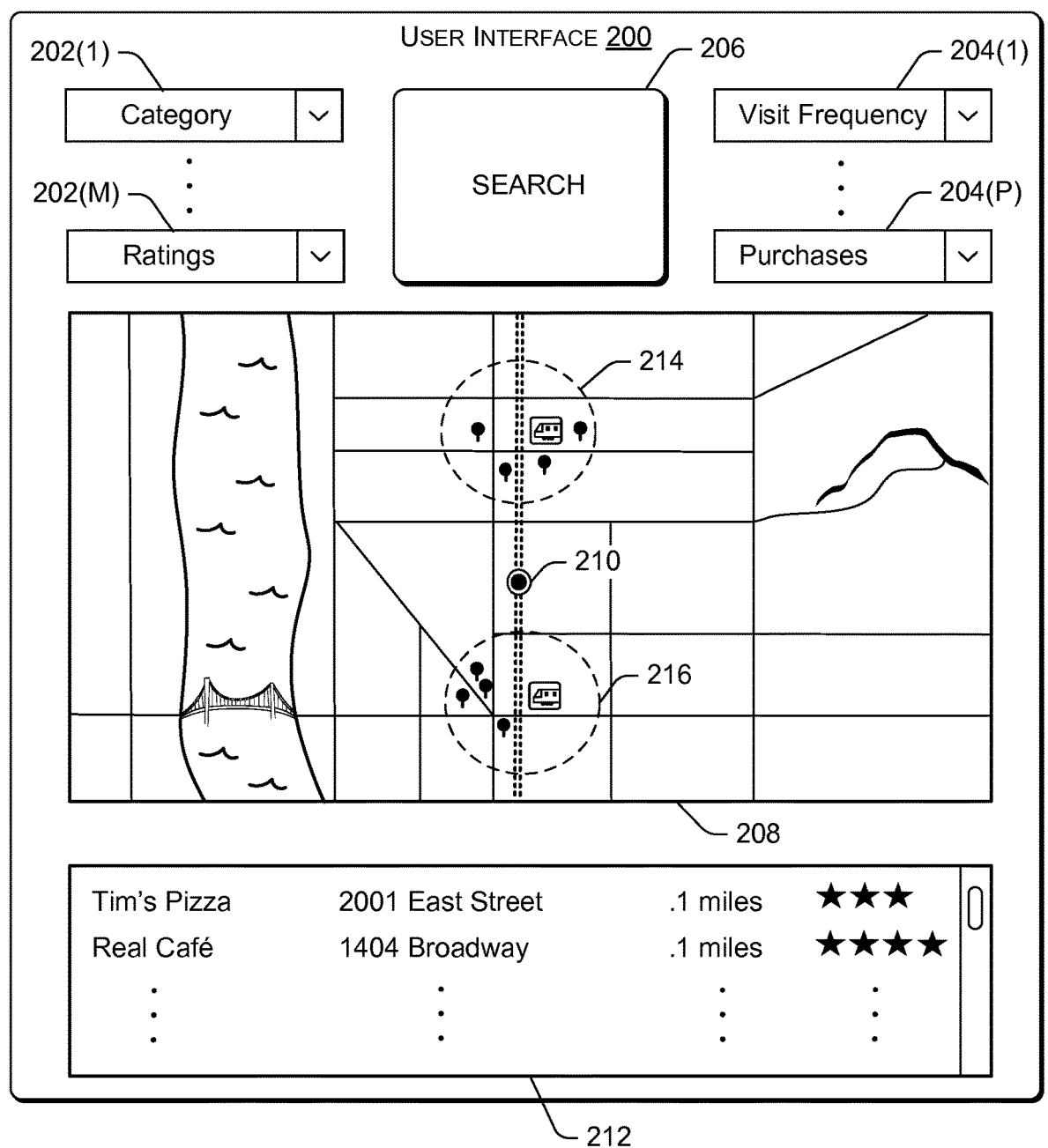
FIG. 2A illustrates an example user interface showing merchants that have been identified based on a transportation mode that is currently being used by a user.

FIG. 2A illustrates the example user interface 200 showing merchants that have been identified based on a transportation mode that is currently being used by a user. In particular, the user interface 200 includes drop down menus 202(1)-202(M) to enable the user to specify attributes of merchants to find (e.g., a desired category of items, a desired price for items, a desired ratings of merchants, etc.). In addition, the user interface 200 includes drop down menus 204(1)-204(P) to enable the user to specify criteria for identifying portions of a geographical region that may be of interest, and associated merchants. For example, the user may request merchant information for regions that are related to locations that are frequented by the user, purchase history, a mode of transportation that is currently being used, an appointment, a current speed or direction of an electronic device, a current navigation route of the user, a transportation route, current weather conditions, current traffic conditions, a current time of day or year, an event, and so on. The user may select a button 206 to cause the service provider 102 to configure geo-fences and identify merchants based on those geo-fences.

The user interface 200 also includes a map 208 of a geographical region for a current location 210 of the user (e.g., the electronic device associated with the user). The map 208 shows locations of merchants that satisfy the criteria specified in the drop down menus 202 and drop down menus 204. In particular, the map 208 may include an icon (e.g., pin) for each merchant at a location of an establishment of the merchant. The user interface 200 also includes a list 212 of information for merchants that are displayed in the map 208.

In this example, the service provider 102 has defined geo-fences 214 and 216 based on a mode of transportation that is being used, namely the subway. The mode of transportation may be determined by prompting the user for information, monitoring speed and/or direction of the user, determining that the user has connected to a wireless access point on the subway, determining that the user has purchased a subway ticket or entered the subway gate, and so on. As illustrated, the geo-fences 214 and 216 are centered on the subway stations and include areas surrounding the subway stations. As such, the map 208 shows icons for merchants that have establishments within the geo-fences 214 and 216, and the list 212 includes information for those merchants.

In some instances, if it is determined that the user is traveling in a particular direction on the subway, the service provider 102 may identify merchants that are more likely to be of interest to the user due to the direction of travel. As one example in FIG. 2A, if the user is traveling north (upwards in FIG. 2A), the map 208 may display icons for merchants within the geo-fence 214 and refrain from displaying icons for merchants within the geo-fence 216.

Further, in some instances, if it is determined that the user is traveling in a particular direction on the subway, the service provider 102 may generate a geo-fence based on the direction of travel. As one example in FIG. 2A, if the user is traveling north (upwards in FIG. 2A), the service provider 102 may generate only the geo-fence 214 and identify merchants within the geo-fence 214.

Figure 2B:
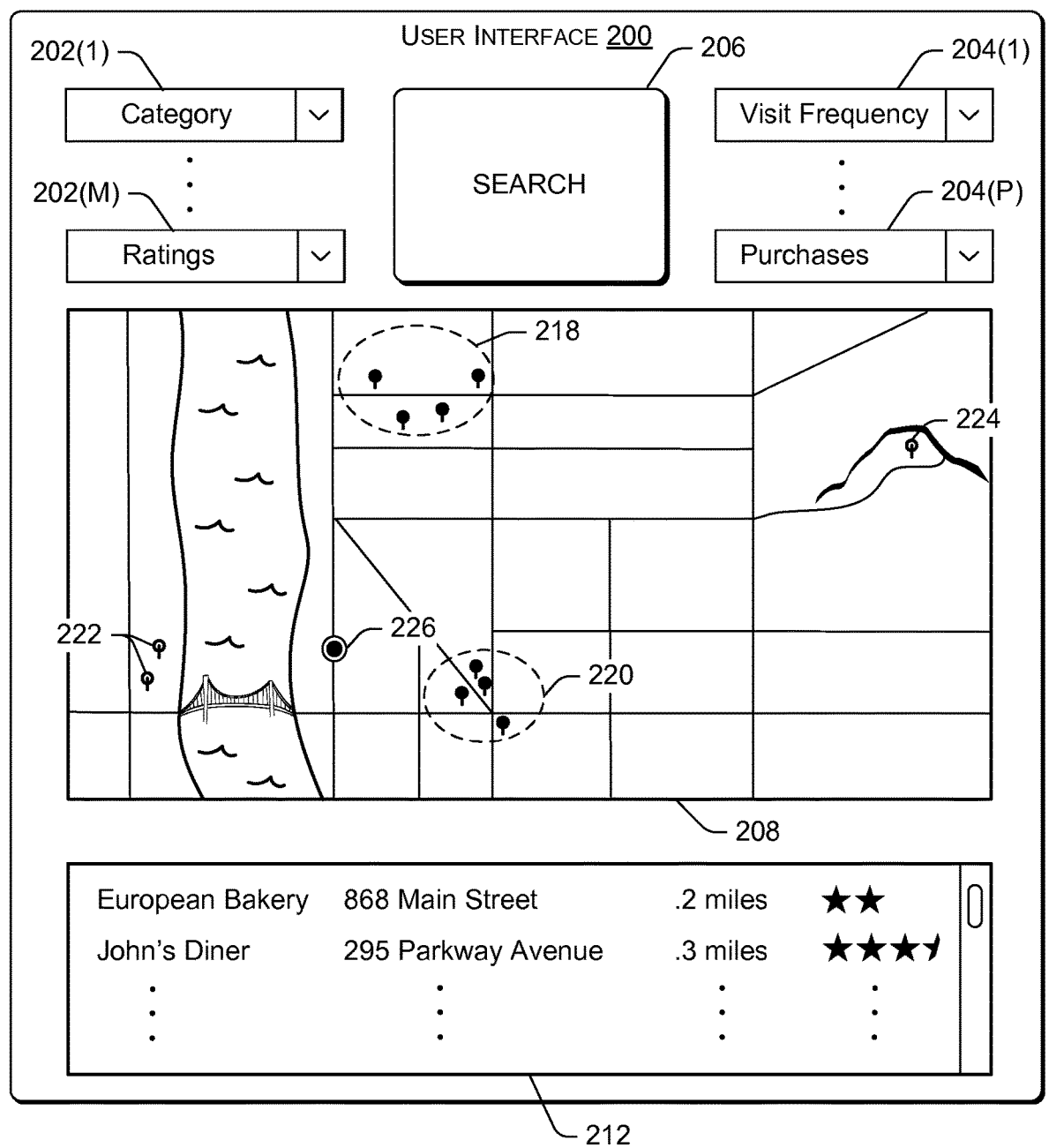
FIG. 2B illustrates an example user interface showing merchants that have been identified based on locations that have been frequented by a user.

FIG. 2B illustrates the example user interface 200 showing merchants that have been identified based on locations that have been frequented by a user. Here, the service provider 102 has defined geo-fences 218 and 220 for portions of the geographical region that have been frequented by the user (e.g., more than a particular number of times). In this example, the user has not traveled across the bridge, or has not done so more than a particular number of times, and accordingly, an area around merchants 222 is not selected (the locations of merchants 222 are not actually shown to the user). Further, the user has not traveled up a hill to a merchant 224 (again, the location of the merchant 224 is not actually shown to the user). As such, the map 208 shows icons for merchants that are located within the geo-fences 218 and 220. The map 208 also shows a current location 226 of the user. As illustrated, the list 212 is updated with information for merchants that are associated with the geo-fences 218 and 220.

Figure 2C:
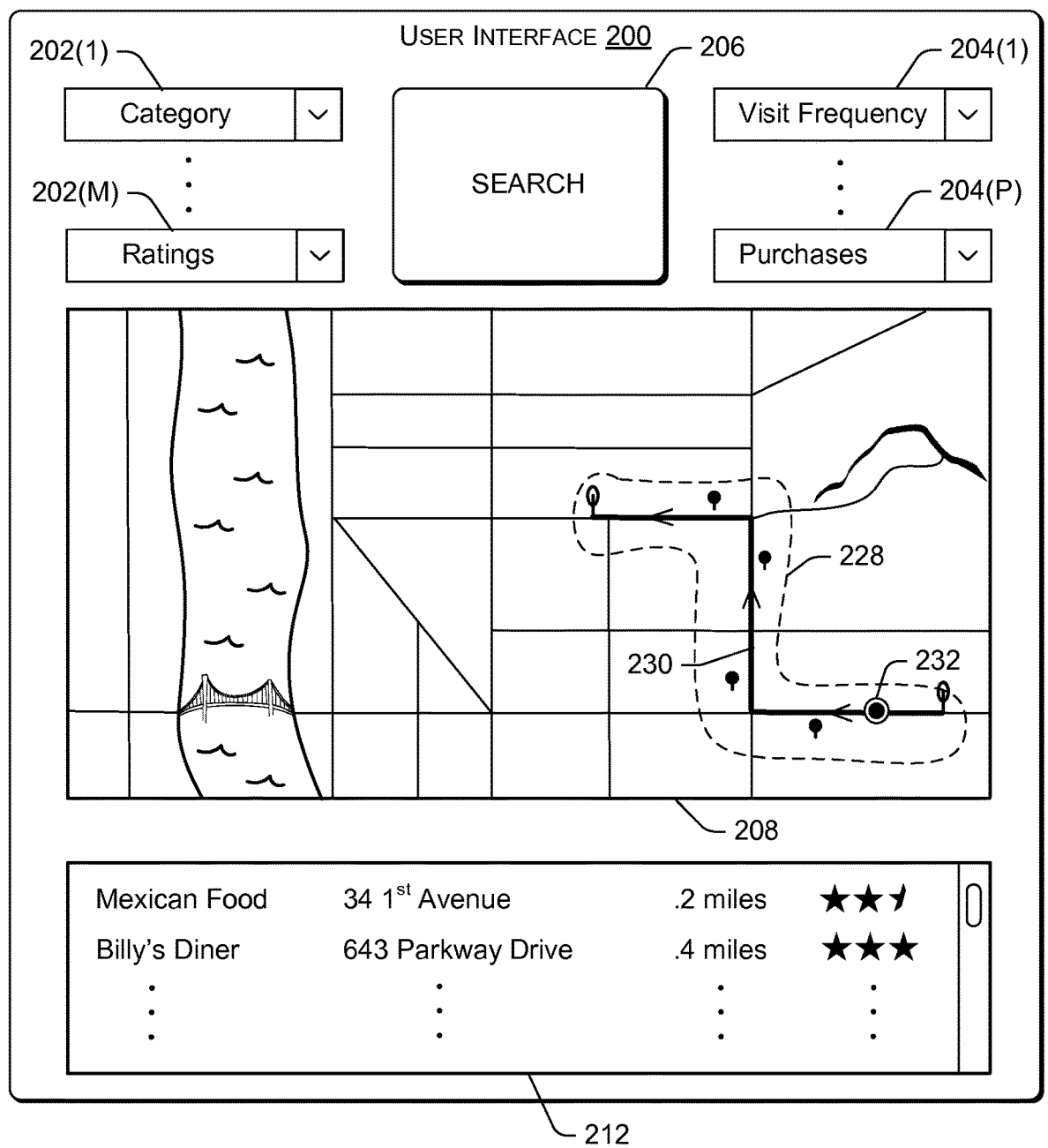
FIG. 2C illustrates an example user interface showing merchants that are located along a navigation route.

FIG. 2C illustrates the example user interface 200 showing merchants that are located along a navigation route. Here, the service provider 102 has defined a geo-fence 228 around a navigation route 230 and the map 208 displays icons for merchants that are located within the geo-fence 228. The navigation route 230 includes a path that the user will travel from a starting location to a destination location. As illustrated, the geo-fence 228 has a non-circular shape and generally extends a particular distance to each side of the navigation route 230. In some instances, the geo-fence 228 may be displayed on the map 208. The user may select the geo-fence 228 and adjust an area that is encompassed by the geo-fence 228. The map 208 also shows a current location 232 of the user along the navigation route 230. The list 212 is updated in this example with information for merchants that are associated with the geo-fence 228.

Figure 2D:
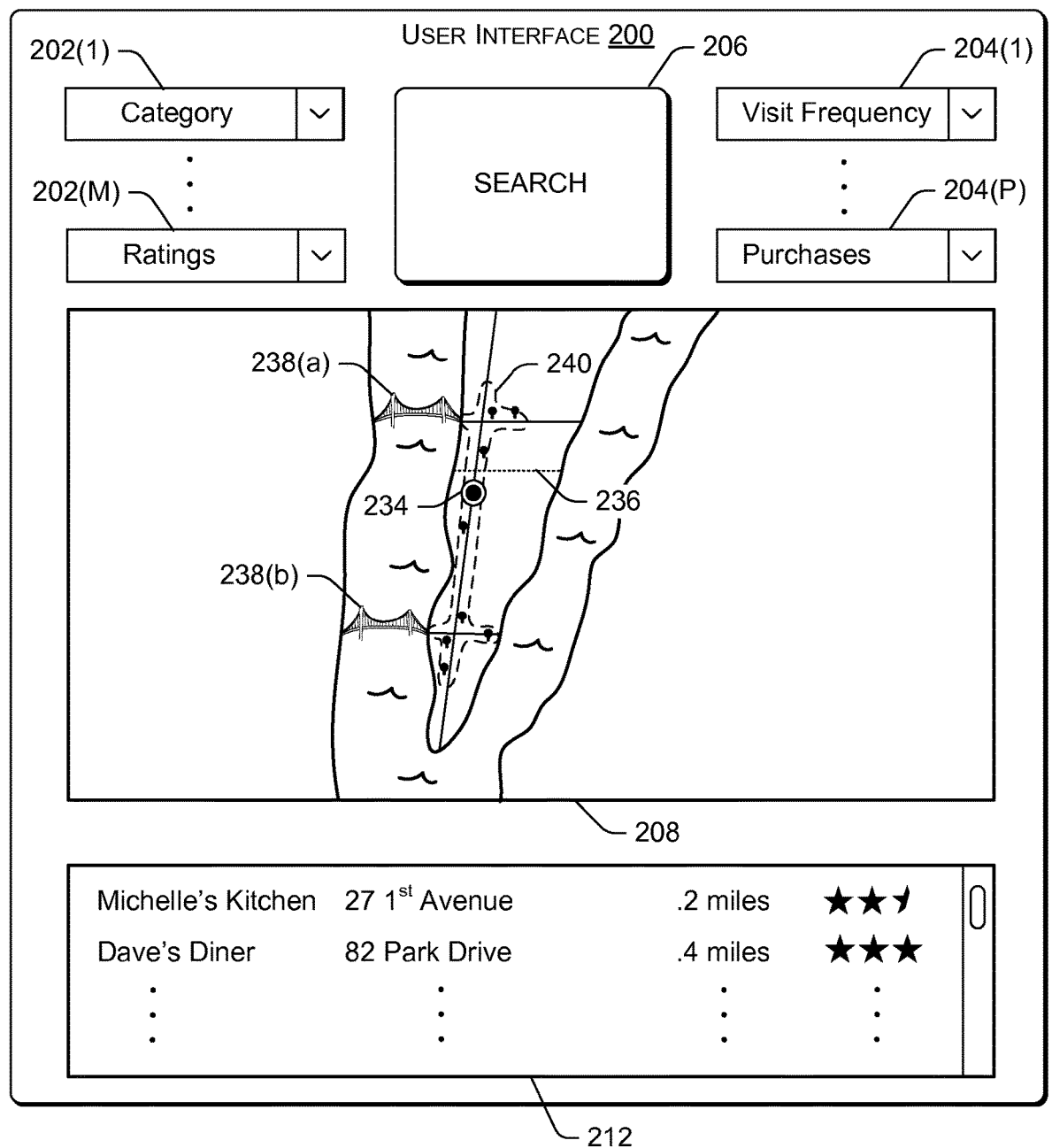
FIG. 2D illustrates an example user interface showing a geo-fence that is based on locations that have been frequented by a user or visited within a window of time.

FIG. 2D illustrates the example user interface 200 showing a geo-fence that is based on locations that have been frequented by a user or visited within a window of time. In this example, the user is traveling by car in Manhattan, N.Y. The map 208 shows a current location 234 of the user, just below a line 236. Here, the user has requested information for merchants based on places that have been previously visited by the user and/or capabilities of the user (e.g., places that can be visited within a time period due to the user's current speed, mode of transportation, etc.). Accordingly, the service provider 102 references purchase history for the user to determine that the user frequently orders food from restaurants that are located in lower Manhattan, below the line 236, and rarely orders food from restaurants that are located across the bridges 238. The service provider 102 also references location information to determine that the user spends the majority of his time in lower Manhattan (e.g., visits locations below the line 236 more than a threshold number of times) and rarely crosses the bridges 238.

Based on these determinations, the service provider 102 determines a geographical region bounding locations that have been visited by the user more than a threshold number of times and/or that have been visited within a window of time. In particular, the service provider 102 identifies lower Manhattan (a region below the line 236). The window of time may include a period of time leading up to the current time (e.g., a last hour, day, week, etc.) or any other period of time (e.g., last week, last month, etc.).

The service provider 102 then generates a geo-fence 240 that is biased toward the geographical region (e.g., biased toward locations that have been frequented by the user or visited recently). In particular, since the user frequently visits lower Manhattan (a region below the line 236), the geo-fence 240 extends farther south from the current location 234 than the geo-fence 240 extends north from the current location 234. In this example, the geo-fence 240 extends to the north from the current location 234 a distance that can be traveled by car in 10 minutes (e.g., extends to a northernmost point on a transportation route and a northeastern point on a transportation route that can be reached in 10 minutes). The geo-fence 240 also extends to the south a distance that can be traveled by car in 20 minutes (e.g., extends to a southernmost point on a transportation route and a southeastern point on a transportation route that can be reached in 20 minutes). In addition, since the user rarely travels across the bridges 238 (or rarely orders food from restaurants that are located across the bridges 238), the geo-fence 240 ends at the bridges 238. That is, the geo-fence 240 does not include transportation routes across the bridges 238.

In this example, the geo-fence 240 extends along transportation routes that are related to the user's current mode of transportation. Since the user is traveling by car, the geo-fence 240 extends along roads in Manhattan. As illustrated, the geo-fence 240 encompasses area to the sides of the transportation routes. The geo-fence 240 may extend along the transportation routes a distance that is based on a current speed of the user (or device associated with the user). For example, as the user's speed increases, the geo-fence 240 may expand to include larger distances along transportation routes.

As such, the geo-fence 240 may include a first geo-fence (or first portion) that extends along transportation routes away from lower Manhattan for a distance that is proportional to a speed of the user and that is reduced according to a biasing distance or factor (e.g., a predetermined distance or factor). Further, the geo-fence 240 may include a second geo-fence (or second portion) that extends along transportation routes toward lower Manhattan for a distance that is proportional to the speed of the user and that is increased according to the biasing distance or factor. For example, if the distance that is proportional to the user's speed is 10 miles, the geo-fence 240 may extend to the north 7 miles (which is reduced by a biasing distance of 3 miles), while the geo-fence 240 may extend to the south 13 miles (which is increased by the biasing distance of 3 miles).

Figure 3:
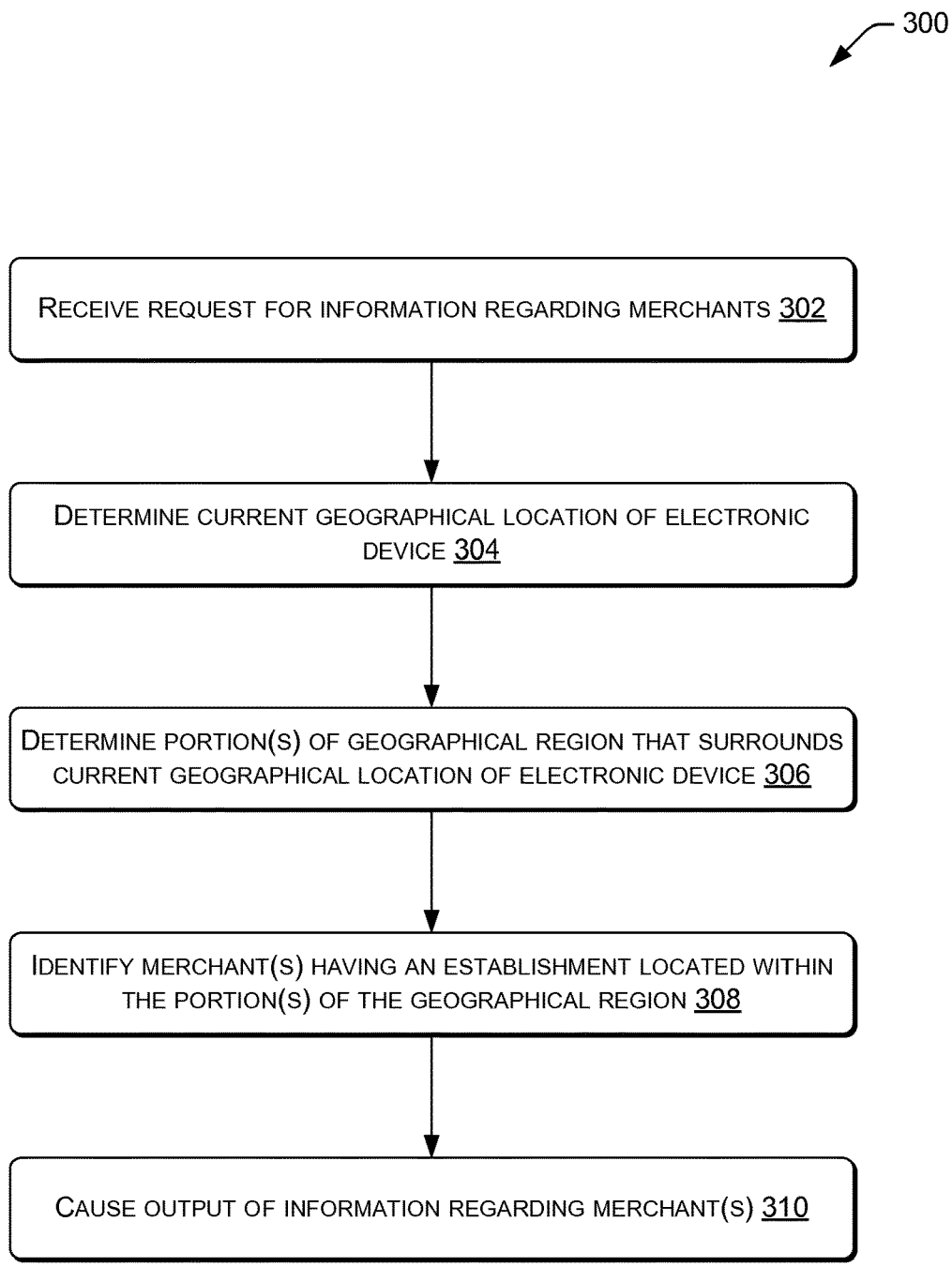
FIG. 3 illustrates an example process to determine a portion(s) of a geographical region that surrounds a current location of an electronic device and to determine merchants having establishments located within the portion(s).
Figure 4:
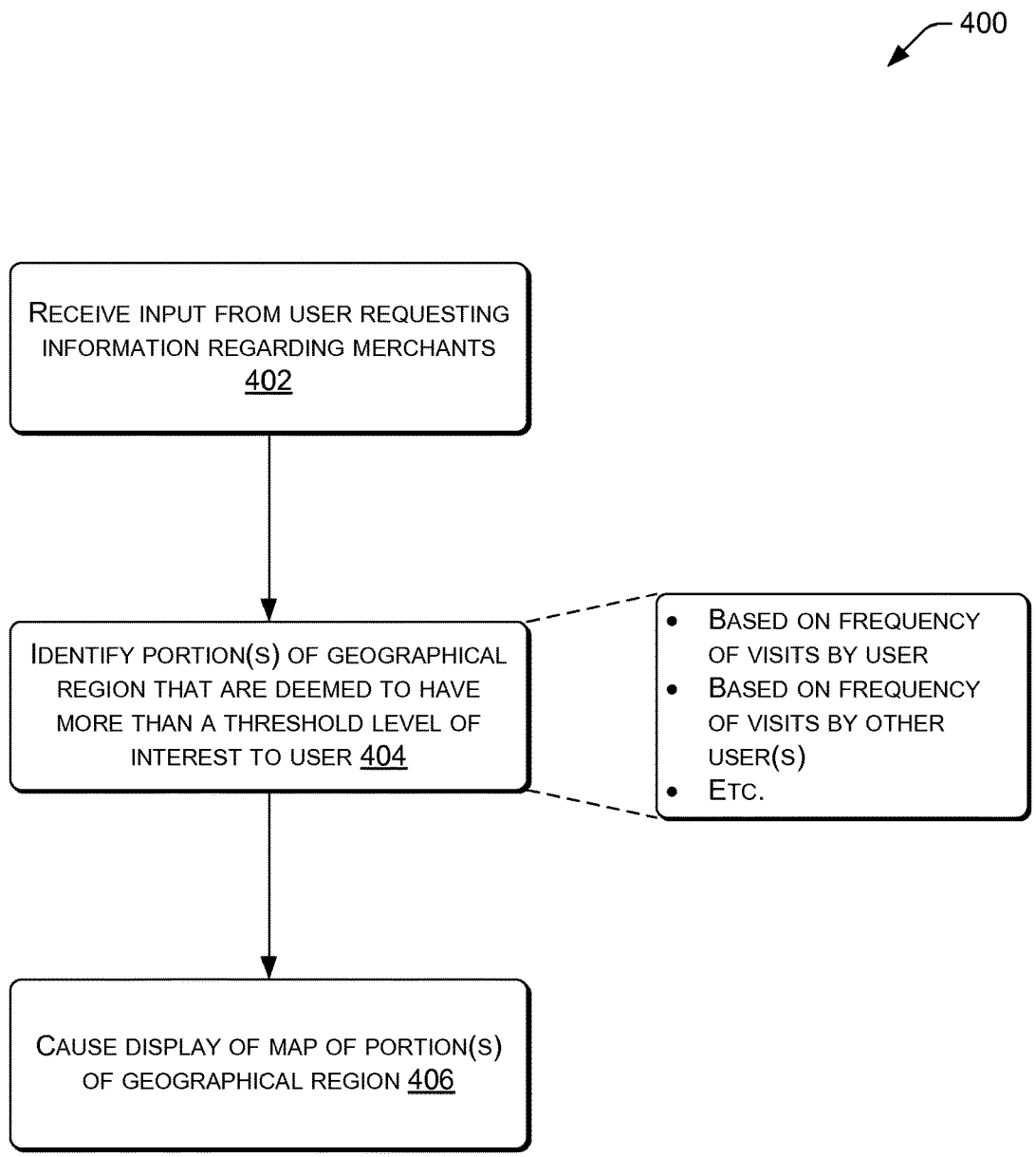
FIG. 4 illustrates an example process to identify a portion(s) of a geographical region that is deemed to have more than a threshold level of interest to a user and to cause display of a map of the portion(s) of the geographical region.

FIGS. 3 and 4 illustrate example processes 300 and 400 for employing the techniques described herein. For ease of illustration the processes 300 and 400 are described as being performed in the architecture 100 of FIG. 1. For example, one or more of the individual operations of the processes 300 and/or 400 may be performed by the service provider 102, the electronic device 108, and/or one of the POS devices 110. However, the processes 300 and 400 may be performed in other architectures. Moreover, the architecture 100 may be used to perform other processes.

The processes 300 and 400 (as well as each process described herein) are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the individual operations may be omitted.

FIG. 3 illustrates the example process 300 to determine a portion(s) of a geographical region that surrounds a current location of an electronic device and to determine merchants having establishments located within the portion(s).

At 302, the service provider 102 may receive a request from the electronic device 108 to receive information regarding merchants. The request may request information for merchants that are associated with a particular attribute, such as a particular rating, a particular category of items, a particular price range, and so on.

At 304, the service provider 102 may determine a current geographical location of the electronic device 108. In some instances, this may include communicating with the electronic device 108 and/or a location-based service to receive location information.

At 306, the service provider 102 may determine, from a geographical region surrounding the current geographical location, one or more portions of the geographical region. The determination at 306 may be based on a location in the geographical region that is most frequented by a user, purchase history for the user, a mode of transportation that is currently being used by the user, an appointment for the user, a current speed or direction of travel, a current navigation route of the user, a transportation route in the geographical region, current weather conditions for the geographical region, current traffic conditions for the geographical region, a current time of day or year, an event occurring in the geographical region, and so on. In some instances, a plurality of pieces of information are used with each piece of information being weighted with a degree of importance. The one or more portions of the geographical region (i) may include merchant establishments that offer for acquisition items that are associated with a same category as items identified in purchase history, (ii) may be within a predetermined proximity to a transportation or navigation route, (iii) may be within a predetermined proximity to a location of an appointment, (iv) may be within a distance to the current geographical location a user (where the distance is based on a current speed), and so on.

At 308, the service provider 102 may identifying one or more merchants each an establishment located within the one or more portions of the geographical region. In some instances, the one or more merchants may also have an attribute specified in the request received at 302.

At 310, the service provider 102 may cause output of information regarding the one or more merchants identified at 308. This may include sending information to the electronic device 108 so that the electronic device 108 may display, render, or otherwise output the information in a displayable, audible, or other format.

FIG. 4 illustrates the example process 400 to identify a portion(s) of a geographical region that is deemed to have more than a threshold level of interest to a user and to cause display of a map of the portion(s) of the geographical region.

At 402, the electronic device 108 may receive input from the user 104 requesting information regarding merchants. The input may include touch input, text input, gesture input, speech input, and so on.

At 404, the electronic device 108 may identify, from a geographical region surrounding a current geographical location of the user 104, one or more portions of the geographical region that are deemed to have more than a threshold level of interest to the user 104. The level of interest may based on a frequency of visits by the user 104, or another user having a threshold level of similarity to the user 104 (e.g., due to user preference, purchase history, demographics, etc.). In one example, the one or more portions of the geographical region include a portion of the geographical region that has been visited more than a threshold number of times. The identification at 404 may include receiving information from the service provider 102 regarding the one or more portions of the geographical region. Alternatively, the identification at 404 may include processing at the electronic device 108 to determine the one or more portions of the geographical region.

At 406, the electronic device 108 may cause display of a map of the one or more portions of the geographical region. The map may include information that identifies a location of an establishment of a merchant that is located in the one or more portions of the geographical region. The map may also include information identifying a level of interest for each of the one or more portions of the geographical region. The level of interest may be based on a number of visits by the user or other users (e.g., the level of interest increases as the number of visits increases). Further, in some instances the map includes information designating a boundary for each of the one or more portions of the geographical region (e.g., the map displays the geo-fence that is used for identifying merchants).

Figure 5:
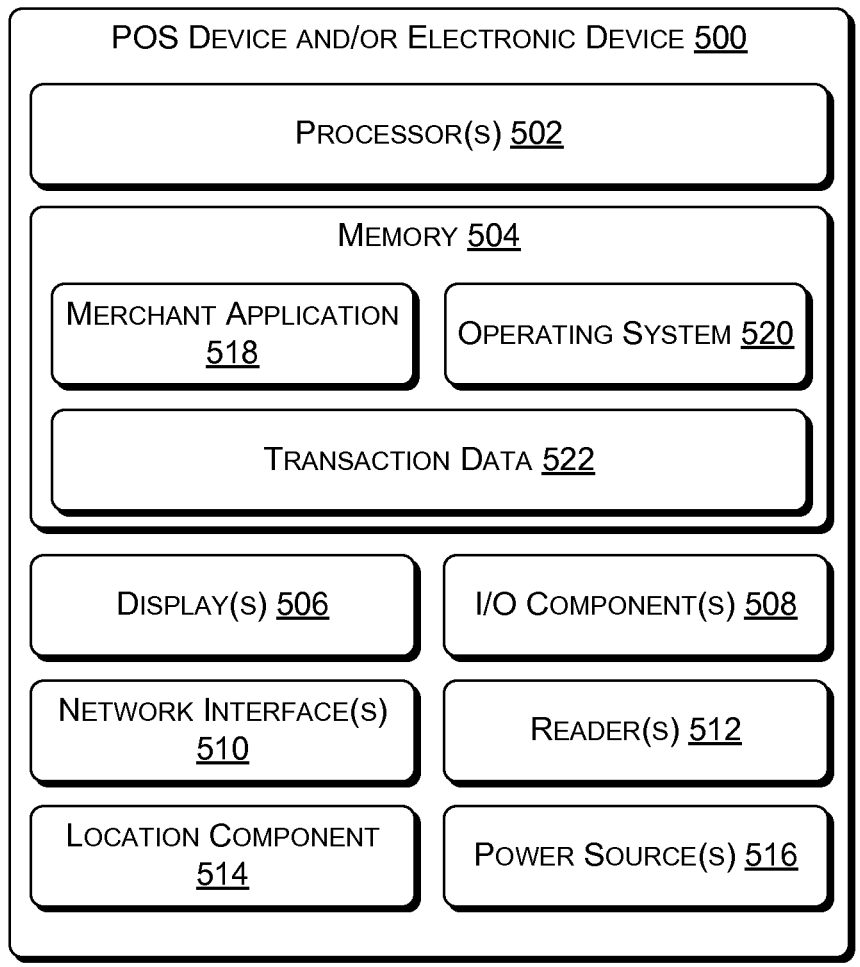
FIG. 5 illustrates select example components of an example POS device and/or electronic device according to some implementations.

FIG. 5 illustrates select example components of an example POS device and/or electronic device 400 (e.g., one of the POS devices 110 or the electronic device 108) according to some implementations. The device 500 may be any suitable type of computing device, e.g., mobile, semi-mobile, semi-stationary, or stationary. Some examples of the device 500 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; or other computing devices capable of sending communications and performing the functions according to the techniques described herein.

In the illustrated example, the device 500 includes one or more processors 502, memory 504, one or more displays 506, one or more input/output (I/O) components 508, one or more network interfaces 510, one or more payment instrument readers 512, at least one location component 514, and one or more power sources 516. Each of the one or more processors 502 may include a central processing unit (CPU), a graphics processing unit (GPU), a microprocessor, a microcomputer, a microcontroller, a state machine, logic circuitries, a digital signal processor, and so on. For instance, the one or more processors 502 may be one or more hardware processors and/or logic circuits of any suitable type specifically programmed or configured to execute the algorithms and processes described herein. Each of the one or more processors 502 may be a single processing unit or a number of processing units, and may include single or multiple computing units or multiple processing cores. The one or more processors 502 can be configured to fetch and execute computer-readable instructions stored in the memory 504, which can program the one or more processors 502 to perform the functions described herein.

The memory 504 (as well as all other memory discussed herein) may include volatile and nonvolatile memory and/or removable and non-removable media implemented in any type of technology for storage of information, such as computer-readable instructions, data structures, program modules, or other data. Such computer-readable media may include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the device 500, the memory 504 may be a type of computer-readable storage media and/or may be a tangible non-transitory media to the extent that when mentioned, non-transitory computer-readable media exclude media such as energy, carrier signals, electromagnetic waves, and signals per se.

The memory 504 may be used to store and maintain any number of functional components that are executable by the one or more processors 502. In some implementations, these functional components comprise instructions or programs that are executable by the one or more processors 502 and that, when executed, implement operational logic for performing the actions and services attributed above to the device 500. Functional components of the device 500 stored in the memory 504 may include a merchant application 518. The merchant application 518 may present an interface on the device 500 to enable the merchant to conduct transactions, receive payments, and so forth, as well as communicating with the service provider 102 for processing payments and sending transaction information. Further, the merchant application 518 may present an interface to enable the merchant to manage the merchant's account, and the like. Additional functional components may include an operating system 520 for controlling and managing various functions of the device 500 and for enabling basic user interactions with the device 500. The memory 504 may also store transaction data 522 that is received based on the merchant associated with the device 500 engaging in various transactions with customers.

In addition, the memory 504 may also store data, data structures and the like, that are used by the functional components. For example, this data may include item information that includes information about the items offered by the merchant, which may include images of the items, descriptions of the items, prices of the items, and so forth. Depending on the type of the device 500, the memory 504 may also optionally include other functional components and data, which may include programs, drivers, etc., and the data used or generated by the functional components. Further, the device 500 may include many other logical, programmatic and physical components, of which those described are merely examples that are related to the discussion herein.

The network interface(s) 510 may include one or more interfaces and hardware components for enabling communication with various other devices over the network or directly. For example, the network interface(s) 510 may enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

FIG. 5 further illustrates that the device 500 may include the one or more displays 506 mentioned above. Depending on the type of computing device used as the device 500, the one or more displays 506 may employ any suitable display technology. For example, the one or more displays 506 may be a liquid crystal display, a plasma display, a light emitting diode display, an OLED (organic light-emitting diode) display, an electronic paper display, or any other suitable type of display able to present digital content thereon. In some examples, the one or more displays 506 may have a touch sensor associated with the one or more displays 506 to provide a touchscreen display configured to receive touch inputs for enabling interaction with a graphic interface presented on the one or more displays 506. Accordingly, implementations herein are not limited to any particular display technology. Alternatively, in some examples, the device 500 may not include the one or more displays 506, and information may be present by other means, such as aurally.

The one or more I/O components 508, meanwhile, may include speakers, a microphone, a camera, and various user controls (e.g., buttons, a joystick, a keyboard, a keypad, etc.), a haptic output device, and so forth.

In addition, the device 500 may include or may be connectable to the one or more payment instrument readers 512 (e.g., card reader). In some examples, the one or more payment instrument readers 512 may plug in to a port in the merchant device, such as a microphone/headphone port, a data port, or other suitable port. In other instances, the one or more payment instrument readers 512 is integral with the entire device 500. The one or more payment instrument readers 512 may include a read head for reading a magnetic strip of a payment card, and further may include encryption technology for encrypting the information read from the magnetic strip. Alternatively, numerous other types of card readers may be employed with the device 500 herein, depending on the type and configuration of a particular device 500.

The location component 514 may include a GPS device able to indicate location information, or the location component 514 may comprise another other location-based sensor. The device 500 may also include one or more additional sensors (not shown), such as an accelerometer, gyroscope, compass, proximity sensor, and the like. Additionally, the device 500 may include various other components that are not shown, examples of which include removable storage, a power control unit, and so forth.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A method comprising:
    receiving, by a payment processing server (PPS) and via an input provided on an interactive graphical user interface displayed on a mobile electronic device, a request for information regarding merchants having a specified attribute, wherein the merchants are associated with the PPS;
    determining, by the PPS, a current geographical location of the mobile electronic device based on one or more signals indicative of most recent geographical coordinates at which the mobile electronic device is detected;
    determining a geographical region surrounding the current geographical location of the mobile electronic device;
    generating, by the PPS and within the geographical region surrounding the current geographical location of the mobile electronic device and prior to identifying any merchant having the specified attribute, one or more personalized geofences within the geographical region, each personalized geofence identifying a corresponding one of one or more sub-regions, the one or more personalized geofences being generated by analyzing real-time and collected data including (i) a location in the geographical region that is most frequented by the user, (ii) purchase history for the user, (iii) a mode of transportation that is currently being used by the user, (iv) an appointment for the user, (v) a current speed or direction of the mobile electronic device, (vi) a current navigation route of the user, (vii) a transportation route in the geographical region, (viii) current weather conditions for the geographical region, (ix) current traffic conditions for the geographical region, (x) a current time of day or year, or (xi) an event occurring in the geographical region;
    identifying, by the PPS, one or more merchants each having the specified attribute and each having an establishment located within the one or more of the sub-regions of the geographical region; and
    updating, by the PPS, the interactive graphical user interface on the mobile electronic device to display information regarding the one or more merchants.

2. The method of claim 1, wherein the specified attribute includes at least one of a particular rating, a particular category of items that are offered for acquisition, or a particular price range of items that are offered for acquisition.

3. The method of claim 1, wherein the information displayed on the interactive graphical user interface regarding the one or more merchants includes at least one of (i) a list of the one or more merchants or (ii) a map of the one or more sub-regions of the geographical region, the map including an icon for each of the one or more merchants at a respective location of an establishment of a respective one of the one or more merchants.

4. One or more non-transitory computer-readable media storing executable instructions that, when executed by one or more processors, cause the one or more processors to:
    receive, by a payment service and via an input provided on an interactive graphical user interface displayed on a mobile electronic device, a request for information regarding merchants associated with the payment service;
    identify, by the payment service, a current geographical location of the mobile electronic device associated with a user based on one or more signals indicative of most recent geographical coordinates at which the mobile electronic device is detected;
    generate, by the payment service and based on the request, personalized geo-fences within a geographical region surrounding the current geographical location of the mobile electronic device, wherein the personalized geo-fences are personalized for the user based on analysis of real-time and collected data corresponding to at least one user specific action with the payment service and one or more merchants;
    identify, by the payment service, one or more merchants having a corresponding establishment located within one or more of the geo-fences; and
    update, by the payment service, the interactive graphical user interface on the mobile electronic device to display information regarding the one or more merchants.

5. The one or more non-transitory computer-readable media of claim 4, wherein execution of the instructions, further cause the one or more processors to determine sub-regions within the geographical region based on at least one of purchase history for the user or a location of an appointment for the user.

6. The one or more non-transitory computer-readable media of claim 4, wherein execution of the instructions, further cause the one or more processors to determine sub-regions within the geographical region based on at least one of a mode of transportation that is currently being used by the user, a current speed of the mobile electronic device, or a current direction of travel of the mobile electronic device.

7. The one or more non-transitory computer-readable media of claim 4, wherein execution of the instructions, further cause the one or more processors to determine sub-regions within the geographical region based on at least one of current weather conditions for the geographical region, a current time of day or year, or an event occurring in the geographical region.

8. The one or more non-transitory computer-readable media of claim 4, wherein execution of the instructions, further cause the one or more processors to determine sub-regions within the geographical region based at least in part on a location in the geographical region that is most frequented by the user.

9. The one or more non-transitory computer-readable media of claim 4, wherein execution of the instructions, further cause the one or more processors to determine sub-regions within the geographical region based on at least one of a current navigation route of the user, a transportation route in the geographical region, or current traffic conditions for the geographical region.

10. The one or more non-transitory computer-readable media of claim 4, wherein execution of the instructions, cause the one or more processors to generate the geo-fences by:
    determining a first geo-fence extending along one or more transportation routes away from the geographical region for a distance that is proportional to a speed of the mobile electronic device and that is reduced according to a biasing distance; and
    determining a second geo-fence extending along one or more transportation routes toward the geographical region for a distance that is proportional to the speed of the mobile electronic device and that is increased according to the biasing distance, wherein
    each of the one or more merchants has the corresponding establishment located within one of the first geo-fence or the second geo-fence.

11. The one or more non-transitory computer-readable media of claim 10, wherein the one or more transportation routes associated with the first geo-fence or the second geo-fence are related to a mode of transportation that is currently being used by the user.

12. The one or more non-transitory computer-readable media of claim 10, wherein at least one of the first geo-fence or the second geo-fence has a size that is based at least in part on an amount of available time the user has before an appointment.

13. The one or more non-transitory computer-readable media of claim 4, wherein the one or more merchants have been visited by the user more than a threshold number of times or within a window of time.

14. The one or more non-transitory computer-readable media of claim 13, wherein sub-regions within the geographical region are deemed to have more than a threshold level of interest to the user due to a frequency of visits by at least one other user, the at least one other user having a threshold level of similarity to the user.

15. A remote service provider, comprising:
    one or more processors; and
    memory communicatively coupled to the one or more processors and storing instructions that, when executed by the one or more processors, cause the one or more processors to:
    receive, via an input provided on an interactive graphical user interface displayed on a mobile electronic device, a request for information regarding merchants associated with the remote service provider;
    identify a current geographical location of the mobile electronic device associated with a user based on one or more signals indicative of most recent geographical coordinates at which the mobile electronic device is detected;
    generate, based on the request, personalized geo-fences within a geographical region surrounding the current geographical location of the mobile electronic device, wherein the personalized geo-fences are personalized for the user based on analysis of real-time and collected data corresponding to at least one user specific action with the remote service provider and one or more merchants;
    identify one or more merchants having a corresponding establishment located within one or more of the geo-fences; and
    update the interactive graphical user interface on the mobile electronic device to display information regarding the one or more merchants.

16. The remote service provider of claim 15, wherein the one or more processors are configured to determine sub-regions within the geographical region based on at least one of purchase history for the user or a location of an appointment for the user.

17. The remote service provider of claim 15, wherein the one or more processors are configured to determine sub-regions within the geographical region based on at least one of current weather conditions for the geographical region, a current time of day or year, or an event occurring in the geographical region.

18. The remote service provider of claim 15, wherein generating the respective geo-fences comprises:
    determining a first geo-fence extending along one or more transportation routes away from the geographical region for a distance that is proportional to a speed of the mobile electronic device and that is reduced according to a biasing distance; and
    determining a second geo-fence extending along one or more transportation routes toward the geographical region for a distance that is proportional to the speed of the mobile electronic device and that is increased according to the biasing distance, wherein
    each of the identified one or more merchants has the corresponding establishment located within one of the first geo-fence or the second geo-fence.

19. The remote service provider of claim 18, wherein at least one of the first geo-fence or the second geo-fence has a size that is based at least in part on an amount of available time the user has before an appointment.

20. The remote service provider of claim 15, wherein the one or more merchants have been visited by the user more than a threshold number of times or within a window of time.

* * * * *